June 10, 1958

L. J. TUMMERS ET AL

CIRCUIT-ARRANGEMENT COMPRISING A FOUR-ZONE TRANSISTOR

Filed Dec. 22, 1953

2,838,617

INVENTORS
LEONARD JOHAN TUMMERS
FREDERIK HENDRIK STIELTJES
BY [signature]
AGENT 2,838,617

CIRCUIT-ARRANGEMENT COMPRISING A FOUR-ZONE TRANSISTOR

Leonard Johan Tummers and Frederik Hendrik Stieltjes, Eindhoven, Netherlands, assignors, by mesne assignments, to North American Philips Company, Inc., New York, N. Y., a corporation of Delaware Application December 22, 1953, Serial No. 399,745

Claims priority, application Netherlands January 13, 1953

7 Claims. (Cl. 179—171)

This invention relates to circuit-arrangements, for example for amplifying electrical signals, comprising a four-zone transistor. The term "four-zone transistor" is on the one hand to be understood to mean a transistor comprising at least four successive zones of alternately opposite conductivity type, and on the other hand the combination of two three-zone transistors, which combination constitutes the electric analogon of the aforesaid four-zone transistor.

A circuit-arrangement comprising a four-zone transistor has been proposed, in which the polarity of the sources of supply voltage associated with the transistor is such that the junction between the first and the second zone is operated in the forward direction, that between the second and the third zone is operated in the blocking direction and that between the third and the fourth zone is again operated in the forward direction, the second and the third zone being thinner than the characteristic diffusion length of the minority charge carriers in these zones, so that by connecting a signal source between the first and the second zone an amplified signal oscillation is obtained between the second and the fourth zone. This known circuit arrangement suffers, however, from the disadvantage of becoming unstable if the resistance in the circuit of the second zone, either the internal resistance of this zone itself or the resistance of the external circuit associated with this zone, becomes too high.

The present invention has for its object to avoid this inconvenience. According to the invention the supply voltages are fed to such a known four-zone transistor with a polarity such that the junction between the first and the second zones is operated in the forward direction, that between the second and the third zone is also operated in the forward direction and that between the third and the fourth zone is operated in the blocking direction.

Figure 1:
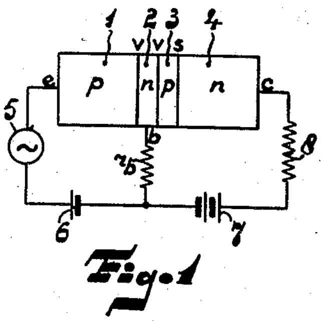
Figure 2:
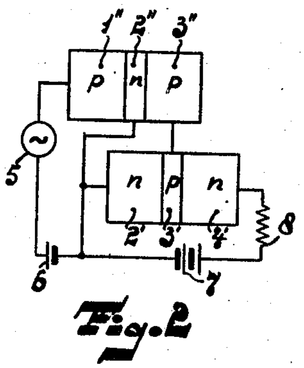
Figure 3:
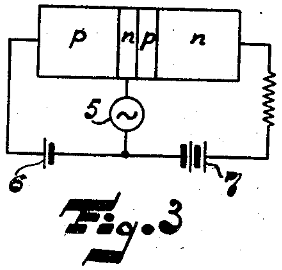
Figure 4:
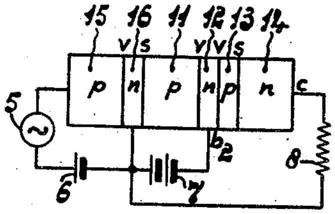
Figure 5:
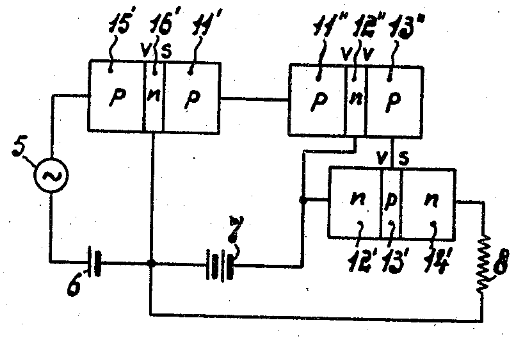

In order that the invention may be readily carried into effect it will now be described in detail with reference to the accompanying drawings, in which Fig. 1 shows a simple example thereof, Fig. 2 shows an electrical analogon of the circuit arrangement shown in Fig. 1, Fig. 3 is a variant of the circuit arrangement shown in Fig. 1, Fig. 4 shows an example for high signal frequencies; and Fig. 5 is an electrical analogon of the circuit arrangement shown in Fig. 4.

In the circuit arrangement shown in Fig. 1, the transistor comprises four zones 1, 2, 3, 4 of alternately opposite conductivity type *p* and *n* respectively. The zones 2 and 3 are thinner than the characteristic diffusion length of the minority charge carriers, in the present case the holes in the zone 2 of negative conductivity type *n* and the electrons in the zone 3 of positive conductivity type *p*, in said zones, respectively. The zone 1 comprises an emitter *e*, the layer 2 comprises a base *b* and the layer 4 comprises a collector *c*, the zone 3 having a floating potential. Connected in the circuit between the emitter *e* and the base *b* are a signal source 5 and a voltage supply 6, the latter having a polarity such that the emitter *e* is positive relatively to the base *b* so that the junction between the zones 1 and 2 is operated in the forward direction.

The circuit between the collector *c* and the base *b* comprises, besides an output impedance 8, a voltage supply 7 which, in accordance with the invention, has a polarity such that the collector *c* is also positive, and this to a higher degree than the emitter *e*, with respect to the base *b* with the result that, as will be seen later, the junction between the zones 2 and 3 is operated in the forward direction but that between the zones 3 and 4 is operated in the blocking direction.

In the electrical analogon of this circuit arrangement shown in Fig. 2, the transistor 1, 2, 3, 4 has been replaced by two three-zone transistors 2', 3', 4' and 1'', 2'', 3'' whose electrodes 2', 2'' and 3', 3'' respectively of corresponding conductivity type are electrically interconnected. The zones 2'' and 3' should again be thinner than the characteristic diffusion length of the minority charge carriers in these zones.

If the sources 5 and 6 were to be equal to zero a comparatively low value of current would pass through the transistor 2', 3', 4', the voltage supply source 7, and the output impedance 8. If, however, the zone 1'' is positive with respect to the zone 2'' due to the sources 5 and 6, a hole conduction current will pass from the zone 1'' to the zone 2'', which drives the zone 3'' positive by diffusion and this nearly as positive as the zone 1'' with respect to the zone 2''. The barrier between the zones 2' and 3' (consequently also that between the zones 2 and 3 in Fig. 1) is now operated in the forward direction *v* with the result that the transistor 2', 3', 4' tends to act as an amplifier with the barrier between the zones 3' and 4' (consequently also between the zones 3 and 4 in Fig. 1) driven in the blocking direction *s*, the current passing to the output impedance 8 exceeding many times that supplied by the sources 5 and 6.

Since the currents of the sources 5, 6 and 7 pass in the same sense through a base resistor $r_b$ which may, if desired, be present or inserted in the base circuit, this resistor tends to stabilise the circuit since it involves negative feedback of the amplifier, in contradistinction to the known circuit arrangement, in which the voltage source 7 is of opposite polarity and the base resistor $r_b$ then involves positive feed-back.

Of course, a perfectly similar circuit arrangement is obtained when reversing the polarity of the bias sources 6, 7 and the sign of conductivity type of the zones.

If the source 5 supplies, for example, pulsatory oscillations either positive or negative amplified impulses may further be obtained at will at the output impedance 8 only by interchanging the polarity of the source 7.

In the circuit-arrangement shown in Fig. 3, the signal voltage source 5 has been shifted from the emitter circuit to the base circuit; otherwise the circuit is similar to that shown in Fig. 1 both in construction and in operation.

Fig. 4 shows an amplifying circuit arrangement for high signal frequencies, which is based on the principle stated in prior U. S. patent application Serial No. 391,083, filed November 9, 1953. Besides the four zones 11, 12, 13, 14 corresponding to the zones 1, 2, 3 and 4 the transistor comprises two further zones 15 and 16. As may be seen from the electrical analogon shown in Fig. 5, the zones 15, 16, 11 are to be regarded as a first transistor 15', 16', 11', the zones 11, 12, 13 as a second transistor 11'', 12'', 13'' and the zones 12, 13, 14 as a third transistor 12', 13', 14'. As shown in the drawing, the barriers between these zones are operated by the voltage sources 6 and 7 in the forward direction *v* and in the blocking direction *s* respectively. Thus, the signal source 5 produces a corresponding signal voltage across the electrode 11 (11′ and 11″ respectively) with the result that, as has been described hereinbefore, the electrode 13 (13′ and 13″ respectively) assumes substantially the same voltage. This voltage is amplified by means of the transistor 12′, 13′, 14′ shown in Fig. 5 and the corresponding zones 12, 13, 14 respectively of the transistor shown in Fig. 4, to the effect of producing an amplified signal on the output impedance.

Since the electrode 12 (12′ and 12″ respectively) has a constant potential owing to the voltage source 7, reaction of the voltage across the output impedance 8 via internal parasitic transistor capacities on the signal source 5 is substantially suppressed, as has been described in said prior patent application, to the effect of raising the limiting frequency up to which the circuit is employable as an amplifier. As compared with the circuit-arrangement referred to above, the present circuit arrangement has the important advantage that the voltage source 7 may supply both the second base $b_2$ associated with the zone 12 and the collector $c$ associated with the zone 14, thus dispensing with a separate source of voltage. Naturally, the collector $c$ may alternatively be connected via the output impedance 8 to the left-hand electrode of the voltage source 6.

What is claimed is:

1. A circuit-arrangement comprising a four-zone transistor having an emitter electrode associated with the first zone, a base electrode associated with the second zone and a collector associated with the fourth zone, the second and third said zones being mutually adjacent and being thinner than the characteristic diffusion length of the minority charge carriers in these zones, said first and third zones both having a first type of conductivity and said second and fourth zones both having a second type of conductivity which is opposite to said first type of conductivity, a source of input signals connected to one of said electrodes, two sources of supply voltage each having a first terminal of the same given polarity and a second terminal of opposite polarity, and means connecting said sources of supply voltage to said zones with polarities such that the junctions between the first and second zones and between the second and third zones are operated in the forward direction from the first to the second zone and from the second to the third zone and the junction between the third and fourth zones is operated in the blocking direction from the third to the fourth zone, said last-named means comprising means connecting said first terminals together and to said base, means connecting one of said second terminals to said emitter, and a load impedance connected between said collector and the remaining said second terminal.

2. A circuit-arrangement comprising a six-zone transistor having an emitter associated with the first zone, a first base associated with the second zone, a second base associated with the fourth zone and a collector associated with the sixth zone, the fourth and fifth said zones being mutually adjacent and being thinner than the characteristic diffusion length of the minority charge carriers in these zones, said first, third and fifth zones all having a first type of conductivity and said second, fourth and sixth zones all having a second type of conductivity which is opposite to said first type of conductivity, a source of input signals connected to said emitter, a source of supply voltage having a tap thereon, and means connecting said source of supply voltage to said zones with polarities such that the junctions between the third and fourth zones and between the fourth and fifth zones are operated in the forward direction from the third to the fourth zone and from the fourth to the fifth zone and the junction between the fifth and sixth zones is operated in the blocking direction from the fifth to the sixth zone, said last-named means comprising means connecting said source of supply voltage between said emitter and said second base, means connecting said tap to said first base, and a load impedance connected between said tap and said collector.

3. A circuit-arrangement comprising a transistor having at least four zones arranged in sequence, the first and third of said zones having a first type of conductivity and the second and fourth of said zones having a second type of conductivity which is opposite to said first type of conductivity, said second and third zones being thinner than the characteristic diffusion length of the minority charge carriers in these zones, a connection to said first zone serving as an emitter, a connection to said second zone serving as a base, a connection to said fourth zone serving as a collector, a first circuit connected between said emitter connection and said base connection and comprising a source of voltage having a polarity to cause the junction of said first and second zones to operate in the forward direction from the first to the second zone, and a second circuit connected between said collector connection and said first circuit and comprising a source of voltage having a polarity to cause the junction of said second and third zones to operate in the forward direction from the second to the third zone and thereby causing the junction of said third and fourth zones to operate in the blocking direction from the third to the fourth zone.

4. A circuit-arrangement as claimed in claim 3, including a signal source connected in said first circuit and including an output load impedance connected in said second circuit.

5. A circuit-arrangement as claimed in claim 4, in which said signal source is connected between said base connection and said source of voltage in said first circuit.

6. A circuit-arrangement as claimed in claim 3, in which said connection to the first zone serving as an emitter comprises a fifth zone of said second conductivity type positioned to precede said first zone and a sixth zone of said first conductivity type positioned to precede said fifth zone, said source of voltage in said first circuit comprising a tap, and means connecting said tap to said fifth zone.

7. A circuit-arrangement comprising a transistor having four zones arranged in sequence, the first and third of said zones having a first type of conductivity and the second and fourth of said zones having a second type of conductivity which is opposite to said first type of conductivity, said second and third zones being thinner than the characteristic diffusion length of the minority charge carriers in these zones, a connection to said first zone serving as an emitter, a connection to said second zone serving as a base, a connection to said fourth zone serving as a collector, a signal source and a first voltage source connected in series between said emitter connection and said base connection, said signal source being connected to said base connection, and a second voltage source and an output load impedance connected in series between said collector connection and the junction of said signal source and said first voltage source, said first voltage source having a polarity to cause the junction of said first and second zones to operate in the forward direction from the first to the second zone, and said second voltage source having a polarity to cause the junction of said second and third zones to operate in the forward direction from the second to the third zone and thereby causing the junction of said third and fourth zones to operate in the blocking direction from the third to the fourth zone.

References Cited in the file of this patent

UNITED STATES PATENTS

| | | |
|---|---|---|
| 2,569,347 | Shockley | Sept. 25, 1951 |
| 2,586,080 | Pfann | Feb. 19, 1952 |
| 2,655,610 | Ebers | Oct. 10, 1953 |

OTHER REFERENCES

"The Transistor," pp. 85–95, published 1951 by Bell Tel. Labr. Inc.

Shea: "Principles of Transistor Circuit," pp. 15, 475–476, published 1953 by John Wiley & Sons, Inc.